United States Patent
Shapira et al.

(10) Patent No.: US 10,028,253 B2
(45) Date of Patent: Jul. 17, 2018

(54) EARLY DECISION ON SINGLE-CHANNEL OR DUAL-CHANNEL TRANSMISSION MODE

(71) Applicant: Celeno Communications (Israel) Ltd., Raanana (IL)

(72) Inventors: Nir Shapira, Raanana (IL); Albert Rapaport, Shoham (IL)

(73) Assignee: CELENO COMMUNICATIONS (ISRAEL) LTD., Raanana (IL)

( * ) Notice: Subject to any disclaimer, the term of this patent is extended or adjusted under 35 U.S.C. 154(b) by 75 days.

(21) Appl. No.: 15/220,412

(22) Filed: Jul. 27, 2016

(65) Prior Publication Data

US 2017/0034806 A1    Feb. 2, 2017

Related U.S. Application Data

(60) Provisional application No. 62/200,054, filed on Aug. 2, 2015.

(51) Int. Cl.
*H04W 72/02* (2009.01)
*H04W 36/06* (2009.01)
(Continued)

(52) U.S. Cl.
CPC ............ *H04W 72/02* (2013.01); *H04B 1/00* (2013.01); *H04W 36/06* (2013.01); *H04W 84/12* (2013.01)

(58) Field of Classification Search
CPC ...... H04W 72/00; H04W 76/00; H04W 36/00
See application file for complete search history.

(56) References Cited

U.S. PATENT DOCUMENTS 8,811,203 B1    8/2014  Liu et al.
2012/0069746 A1*  3/2012  Park ................... H04W 72/082
                                                  370/252

(Continued)

OTHER PUBLICATIONS

IEEE Standard 802.11ac, "IEEE Standard for Information technology—Telecommunications and information exchange between systems Local and metropolitan area networks—Specific requirements; Part 11: Wireless LAN Medium Access Control(MAC) and Physical Layer (PHY) Specifications; Amendment 4: Enhancements for Very High Throughput for Operation in Bands below 6 GHz", 425 pages, Dec. 11, 2013.

(Continued)

*Primary Examiner* — Andrew Lai
*Assistant Examiner* — Sumitra Ganguly
(74) *Attorney, Agent, or Firm* — D. Kligler IP Services Ltd.

(57) ABSTRACT

A Wireless Local Area Network (WLAN) device includes multiple transmission/reception (TX/RX) chains, and control circuitry. The TX/RX chains include first TX/RX chains tuned to a first channel, and second TX/RX chains that are selectively tuned to the first channel or to a different second channel. The control circuitry is configured to receive, via at least one of the TX/RX chains, a frame preamble signal including a first part and a second part, which are both transmitted over either the first channel alone or over both the first and second channels, and the first part is decoded from the first channel alone, to make a decision, before receiving the entire first part, whether the second part is transmitted over the first channel alone or over both the first and second channels, and to tune the second TX/RX chains to the first channel or to the second channel, based on the decision.

24 Claims, 4 Drawing Sheets

(51) Int. Cl.
*H04B 1/00* (2006.01)
*H04W 84/12* (2009.01)

(56) References Cited

U.S. PATENT DOCUMENTS

| | | | | |
|---|---|---|---|---|
| 2013/0107990 A1* | 5/2013 | Zhang | ............... | H04L 27/2613 375/329 |
| 2013/0286938 A1* | 10/2013 | Porat | ................ | H04L 27/2613 370/328 |
| 2014/0105170 A1* | 4/2014 | Seok | .................. | H04L 5/001 370/329 |
| 2014/0369303 A1 | 12/2014 | Gong et al. | | |

OTHER PUBLICATIONS

IEEE Standard 802.11k, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 1: Radio Resource Measurement of Wireless LANs", 244 pages, Jun. 12, 2008.

IEEE Standard 802.11n, IEEE Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications; Amendment 5: Enhancements for Higher Throughput, 536 pages, Oct. 29, 2009.

International Application #PCT/IB2016/054475 Search Report dated Nov. 21, 2016.

ETSI Standard EN 301 893, "Broadband Radio Access Networks (BRAN); 5 GHz high performance RLAN; Harmonized EN covering the essential requirements of article 3.2 of the R&TTE Directive", version 1.7.0, 90 pages, Jan. 2012.

* cited by examiner

EARLY DECISION ON SINGLE-CHANNEL OR DUAL-CHANNEL TRANSMISSION MODE

CROSS-REFERENCE TO RELATED APPLICATIONS

This application claims the benefit of U.S. Provisional Patent Application 62/200,054, filed Aug. 2, 2015, whose disclosure is incorporated herein by reference.

TECHNICAL FIELD

Embodiments described herein relate generally to communications systems, and particularly to methods and systems for early decision on transmission mode.

BACKGROUND

A Wireless Local-Area Network (WLAN) typically comprises one or more Access Points (APs) that communicate with stations (STAs). WLAN communication protocols are specified, for example, in the IEEE 802.11 family of standards, such as in the 802.11n-2009 standard entitled "IEEE Standard for Information technology—Local and metropolitan area networks—Specific requirements—Part 11: Wireless LAN Medium Access Control (MAC) and Physical Layer (PHY) Specifications Amendment 5: Enhancements for Higher Throughput," 2009; in the 802.11ac-2013 standard entitled "IEEE Standard for Information technology—Local and metropolitan area networks—Specific requirements—Part 11: Wireless LAN Medium Access Control (MAC) and Physical Layer (PHY) Specifications Amendment 4: Enhancements for Very High Throughput for Operation in Bands below 6 GHz," 2013; and in the IEEE 802.11k-2008 standard entitled "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 1: Radio Resource Measurement of Wireless LANs," 2008, which are incorporated herein by reference. WLANs are also commonly referred to as Wi-Fi networks.

SUMMARY

An embodiment that is described herein provides a wireless Local Area Network (WLAN) device that includes multiple transmission/reception (TX/RX) chains and control circuitry. The TX/RX chains include first TX/RX chains tuned to a first channel, and second TX/RX chains that are selectively tuned to the first channel or to a different second channel. The control circuitry is configured to receive, via at least one of the TX/RX chains, a frame preamble signal including a first part and a second part, which are both transmitted over either the first channel alone or over both the first and second channels, and the first part is decoded from the first channel alone, to make a decision, before receiving the entire first part, whether the second part is transmitted over the first channel alone or over both the first and second channels, and to tune the second TX/RX chains to the first channel or to the second channel, based on the decision.

In some embodiments, the WLAN device operates in accordance with the IEEE 802.11ac specifications, the first and second channels include respective primary and secondary 80 MHz channels, and the first and second parts respectively include a legacy part and a Very High Throughput (VHT) part of the frame preamble signal. In other embodiments, the control circuitry is configured to tune the second TX/RX chains to the first channel before receiving the frame preamble signal, and to subsequently tune the second TX/RX chains to the second channel in response to deciding that the second part is transmitted over both the first and second channels. In yet other embodiments, the control circuitry is configured to tune the second TX/RX chains to the second channel before receiving the frame preamble signal, and to subsequently tune the second TX/RX chains to the first channel in response to deciding that the second part is transmitted over the first channel alone.

In an embodiment, the control circuitry is configured to tune the second TX/RX chains to the second channel before a beginning of the second part, so as to receive the entire second part by the second TX/RX chains. In another embodiment, the control circuitry includes a Local Oscillator (LO) multiplexer that in a first setting outputs a first LO signal for tuning the second TX/RX chains to the first channel and in a second setting outputs a second LO signal for tuning the second TX/RX chains to the second channel, and the control circuitry is configured to tune the second TX/RX chains to the first channel or to the second channel by setting the LO multiplexer to the first setting or to the second setting, respectively. In yet another embodiment, the first part of the frame preamble signal includes a bandwidth field indicative of whether the second part is transmitted over the first channel alone or over both the first and second channels, and the control circuitry is configured to make the decision by decoding only a portion of the first part containing the bandwidth field.

In some embodiments, the frame preamble signal includes an Orthogonal Frequency Division Multiplexing (OFDM) signal that carries the bandwidth field over multiple sub-carriers, and the control circuitry is configured to apply to selected sub-carriers a matched filter whose taps equal an expected value of the bandwidth field when the second part is transmitted over both the first and second channels. In other embodiments, the frame preamble signal is duplicated over multiple sub-bands of the first channel, and only when the frame is transmitted over both the first and second channels, the frame preamble signal is additionally duplicated over multiple sub-bands of the second channel, and the control circuitry is configured to make the decision by correlating the frame preamble signal between one or more of the sub-bands in the first channel and one or more of the sub-bands in the second channel.

In yet other embodiments, the control circuitry is configured to store first phase differences between at least some of the TX/RX chains, the first phase differences corresponding to beamforming (BF) information estimated using a BF calibration procedure, to generate second phase differences including a re-calibrated version of the first phase differences, to resolve phase ambiguities among the TX/RX chains by comparing the first phase differences with the second phase differences, and to transmit a beamformed frame via the TX/RX chains based on the BF information and on the resolved phase ambiguities.

In an embodiment, the control circuitry is configured to re-calibrate the phase differences by measuring a phase difference between a reference signal injected into one TX/RX chain and a portion of the reference signal that is received in another TX/RX chain due to residual leakage. In another embodiment, the WLAN device further includes an auxiliary RX chain tuned to the second channel independently from a tuning selected for the second TX/RX chains, and the control circuitry is configured to generate channel clearance and channel interference indications for the second channel based on a signal received via the auxiliary Rx chain, when the second TX/RX chains are all tuned to the first channel.

There is additionally provided, in accordance with an embodiment that is described herein, a method for communication including, in a Wireless Local Area Network (WLAN) device that includes multiple transmission/reception (TX/RX) chains, including one or more first TX/RX chains tuned to a first channel and one or more second TX/RX chains that are selectively tuned to the first channel or to a different second channel, receiving, via at least one of the TX/RX chains, a frame preamble signal including a first part and a second part, which are both transmitted either over the first channel alone or over both the first and second channels, and the first part is decoded from the first channel alone. A decision is made, before receiving the entire first part, whether the second part is transmitted over the first channel alone or over both the first and second channels. The second TX/RX chains are tuned to the first channel or to the second channel based on the decision.

These and other embodiments will be more fully understood from the following detailed description of the embodiments thereof, taken together with the drawings in which:

DETAILED DESCRIPTION OF EMBODIMENTS

Overview

Figure 1:
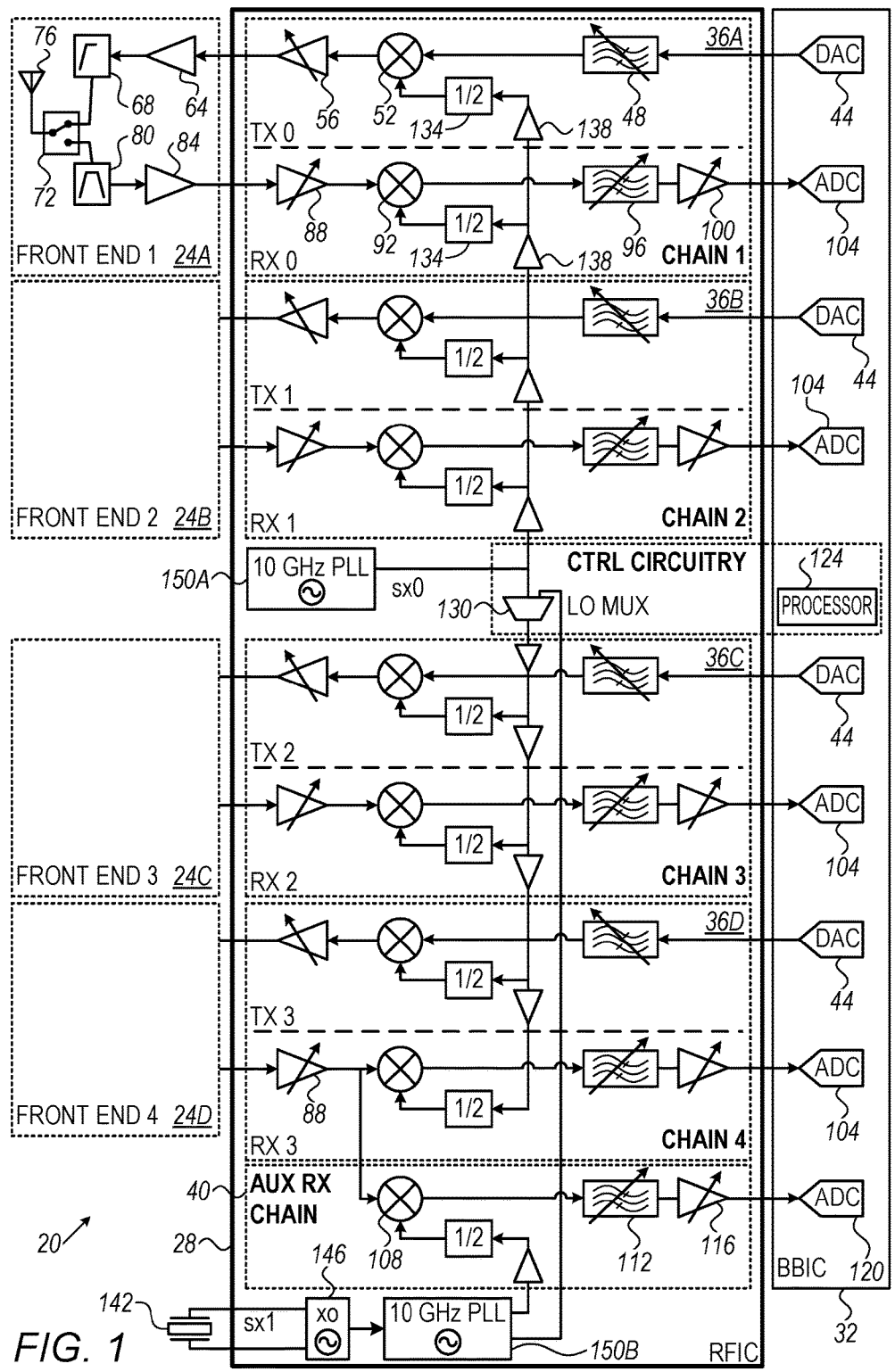
FIG. 1 is a block diagram that schematically illustrates a WLAN device, in accordance with an embodiment that is described herein.

One way to achieve high data rate in communication systems such as WLAN is to communicate over wide bandwidths. The IEEE 802.11ac standard cited above introduces two Very High Throughput (VHT) communication modes: a single-channel mode for communicating over an 80 MHz primary channel, and a dual-channel mode for communicating over two 80 MHz channels—the 80 MHz primary channel plus an 80 MHz secondary channel. The single-channel mode is also referred to as an 80 MHz mode, and the dual-channel mode is also referred to as an (80+80) MHz mode or a 160/(80+80) MHz mode. For backward compatibility, a WALN device supporting VHT is required to support the legacy 40 MHz and 20 MHz channels, as well.

Embodiments that are described herein provide improved methods and systems for WLAN communication, e.g., using the VHT single-channel and dual-channel modes. In the disclosed embodiments, a WLAN device (which may serve as an AP or STA) comprises multiple transmission/reception (TX/RX) chains for conducting WLAN communication with a remote WLAN device on a given communication channel. One or more of the TX/RX chains are tuned to the primary channel and are referred to herein as "primary TX/RX chains." One or more other TX/RX chains can be tuned to the primary channel or to the secondary channel, and are referred to herein as "secondary TX/RX chains." In an embodiment, the device also comprises an auxiliary RX channel tuned to the secondary channel independently of the tuning selected for the secondary TX/RX chains.

A frame communicated in a WLAN typically comprises a preamble that carries no user data but is rather used for assisting the receiver in detecting the frame and in preparing for decoding the frame data. The entire VHT frame is transmitted either in the single-channel mode or in the dual-channel mode, wherein the selected mode for transmission is typically unknown to the receiver. The preamble of a VHT frame comprises a first part and a second part, which are both transmitted either over the primary channel alone or over both the primary and secondary channels. The preamble is duplicated over multiple 20 MHz sub-bands spanning the frame full bandwidth. The first part of the preamble is decodable from the first channel alone, e.g., using one or more of the 20 MHz sub-bands of the primary channel. To support dynamic usage of the available bandwidth, a frame sent over the WLAN may be communicated using a selected channelization mode or bandwidth mode (BW-mode), which is signaled within the first part of the preamble.

In principle, a WALN device receiving a frame via one or more of the TX/RX chains can decode the BW-mode bits from the first part of the preamble, and then tune the secondary TX/RX chains to the primary or secondary channel based on the actual BW-mode of the frame. The problem with this approach is that the latency in decoding the BW-mode bits is typically long, and therefore the receiver may fail to tune the secondary TX/RX chains in time to prepare for receiving the second part of the preamble.

In the disclosed embodiments, the receiver decides, before receiving the entire first part, whether the second part is transmitted over the primary channel alone or over both the primary and secondary channels. Making this early decision enables the receiver to tune the secondary TX/RX chains on time, before receiving the beginning of the second part. Using these techniques, a device whose TX/RX chains support up to 80 MHz channels can dynamically support also frames transmitted in the 160/(80+80) MHz mode.

The receiver can make the early decision in various ways. In some embodiments, the last field in the first part of the preamble contains the BW-mode bits, and the receiver applies Viterbi decoding to the initial part of this field to decode the BW-mode bits. In other embodiments, the preamble signal is carried over multiple sub-carriers of several OFDM symbols, and the receiver makes the decision by converting the signal to time-frequency representation and applying one or more filters matched to the expected bits in the frequency domain. In yet other embodiments, the preamble is duplicated over multiple 20 MHz sub-bands of the channel being used, and the receiver checks whether the preamble in the sub-bands of the primary channel are highly correlated with the preamble in the sub-bands of the secondary channel.

In some disclosed embodiments, the receiver comprises a Local Oscillator (LO) multiplexer (or simply "LO mux" for brevity) that accepts a first LO signal for tuning to the primary channel (single-channel mode) and a second LO signal suitable for tuning to the secondary channel (dual-channel mode). The receiver tunes the secondary TX/RX chains by setting the LO mux to output the relevant LO signal.

In some embodiments, when operating in a listening mode, the receiver controls the LO mux as described herein. In a disclosed process referred to herein as OPTION1, the receiver initializes the LO mux to the dual-channel mode and switches to the single-channel mode when deciding that the BW-mode of the received frame is one of the 80 MHz, 40 MHz and 20 MHz modes. In an alternative process referred to as OPTION2, the receiver initializes the LO mux to the single-channel mode, and switches to the dual-channel mode in response to deciding that the received frame is transmitted in the 160/(80+80) MHz BW-mode.

Prior to transmitting a frame on a given channel, the WLAN device is required to verify that the channel is clear and suffers from no radar interferences. When initializing the LO mux using OPTION2, the secondary channel is not available via the secondary TX/RX chains, and the WLAN device generates the relevant clearance and radar interference indications from the signal received via an auxiliary chain, as described above.

In some embodiments, the WLAN device is required to transmit one or more frames using beamforming techniques. To this end, the device obtains Channel State Information (CSI) identifying the communication channel, and configures steering parameters to be used in the beamformed transmissions based on the CSI. In some embodiments, to maintain phase coherency among the TX/RX chains, the device stores the phase differences used in obtaining the CSI. After transmit or receive operations that involve switching the LO mux (which cause phase coherency loss) the device re-calibrates the phase differences, e.g., using residual leakage loopback methods. In subsequent beamformed transmissions, the device resolves ambiguity in the phase differences by comparing the phase differences stored with the CSI with the re-calibrated phase differences.

System Description

FIG. 1 is a block diagram that schematically illustrates a WLAN device 20, in accordance with an embodiment that is described herein. Device 20 may operate as a WLAN Access Point (AP) or as a WLAN station (STA). Device 20 is configured to communicate with remote WLAN devices in accordance with a WLAN standard such as the IEEE 802.11 standards, cited above.

In the present example, device 20 transmits and receives WLAN signals using four transmission/reception (TX/RX) chains. The four TX/RX chains comprising four respective front-ends 24A . . . 24D and four respective Radio Frequency (RF) chains 36A . . . 36D. RF chains 36A . . . 36D are comprised in an RF Integrated Circuit (RFIC) 28. Baseband processing of the transmitted and received signals is performed in a Baseband Integrated Circuit (BBIC) 32. BBIC 32 also comprises a processor 124, which processes baseband signals of the RF chains and processes baseband signals for transmission via the RF chains. Processor 124 also controls and manages various tasks for device 20.

In each TX/RX chain, the transmit path begins in BBIC 32, which generates a digital baseband signal for transmission. A Digital to Analog Converter (DAC) 44 converts the digital baseband signal into an analog signal. In the corresponding RF chain, a Band-Pass Filter (BPF) 48 filters the analog signal, a mixer 52 up-converts the signal to RF, and an amplifier 56 amplifies the RF signal. In the respective front-end, the RF signal is amplified with a Power Amplifier (PA) 64, filtered with a Low-Pass Filter (LPF) 68, and provided via a TX/RX switch 72 to an antenna 76.

In the receive path of each TX/RX chain, antenna 76 receives an RF signal, and the signal passes through the TX/RF switch and is filtered by a filter 80. A Low-Noise Amplifier (LNA) 84, referred to as an external LNA, amplifiers the signal before providing it to the corresponding RF chain in RFIC 28. In the RFIC, the signal is amplified by an additional LNA 88, referred to as an internal LNA. A mixer 92 down-converts the RF signal to baseband, a baseband filter 96 filters the down-converted signal, and the signal is then amplified by a of Variable-Gain Amplifier (VGA) 100 (not shown). The baseband signal is then provided to BBIC 32, in which the baseband signal is converted into a digital signal by an Analog-to-Digital Converter (ADC) 104. The BBIC then proceeds to demodulate the digital signal, e.g., using processor 124. In a WLAN, the signal may comprise, for example, an Orthogonal Frequency Division Multiplexing (OFDM) signal.

Each of the transmit and receive paths of the RF chain is typically implemented in an In-Phase/Quadrature (I/Q) configuration. For the sake of simplicity, FIG. 1 depicts only the components that process the In-Phase (or Quadrature) baseband signal. The transmit path therefore comprises DAC 44, filter 48 and mixer 52 per each of the In-Phase and Quadrature branches. Similarly, the receive path comprises mixer 92, filter 96 and amplifier 100 per each of the In-Phase and Quadrature branches.

In some embodiments, the four TX/RX chains of device 20 are tuned to the same communication channel, so as to support various diversity or Multiple-Input Multiple-Output (MIMO) schemes. In such embodiments, mixers 52 and in the four RF chains 36A . . . 36D are typically driven with the same Local Oscillator (LO) frequency.

RF chains 36A and 36B are also referred to as "primary RF chains" and the TX/RX chains containing these RF chains are also referred to as "primary TX/RX chains." Similarly, RF chains 36C and 36D are also referred to as "secondary RF chains" and the TX/RX chains containing them are also referred to as "secondary TX/RX chains."

In some embodiments, different TX/RX chains are tuned to different respective channels. In the present example, the primary TX/RX chains are both tuned to a first channel, also referred to as a "primary channel" and the secondary TX/RX chains can be tuned to the first channel or to a second different channel that is also referred to as a "secondary channel."

In each TX/RX chain, LNA 88 and VGAs 100 have variable gains, which are typically controlled by processor 124 as part of an Automatic Gain Control (AGC) mechanism. In an example implementation, the AGC mechanism may set the gains of LNA 88 and VGAs 100 such that the external LNA 84 in FE 24, LNA 88 and ADC 104 do not saturate.

In addition to the four TX/RX chains (two primary chains plus two secondary chains), device 20 further comprises an auxiliary reception (RX) chain 40. Auxiliary chain 40 is typically used for analyzing signal activity and interference on the secondary channel, e.g., when the secondary TX/RX chains are tuned to the primary channel. The signal activity evaluation can be used, for example, for identifying alternative channels that device 20 may later choose to switch to, or for collecting statistical activity data. (Throughout the present patent application, the terms "channels," "frequency channels" and "communication channels" are used interchangeably.) In example embodiments, auxiliary chain 40 is used for verifying that the secondary channel is free of radar signals, or free of interference in general. The use of auxiliary chain 40 is addressed in greater detail below.

In the example of FIG. 1, auxiliary chain 40 shares front-end 24 including its antenna 76 and also internal LNA 88 of one of the primary TX/RX chains. In other words, the input to auxiliary chain 40 is the RF signal produced by internal LNA 88 of one of the secondary TX/RX chains. A mixer 108 down-converts this RF signal to baseband, a baseband filter 112 filters the down-converted signal, and the signal is then amplified by a Variable-Gain Amplifiers (VGA) 116. The baseband signal of the auxiliary chain is provided to BBIC 32, where it is converted into a digital signal by an Analog-to-Digital Converters (ADC) 120. Typically, the auxiliary RX chain comprises In-Phase and Quadrature branches, in which case auxiliary chain 40 comprises mixer 108, filter 112, VGA 116 and ADC 120 per each of the In-Phase and quadrature branches.

In some embodiments, instead of auxiliary chain 40, device 20 comprises a full RX chain that has its own LNA such as LNA 88 and a front end such as front end 24 (or only those elements of the front end required for reception.)

Providing the input to auxiliary chain 40 from the LNA output of a secondary chain is advantageous for several reasons. For example, since most of the RF hardware is shared between the secondary and auxiliary chains, the added cost, size and power consumption incurred by the auxiliary chain is small. In the disclosed embodiments, auxiliary chain 40 is used mainly for signal detection rather than demodulation, whereas the primary and secondary chains are used for signal demodulation. As such, the performance requirements from auxiliary chain 40 are typically more relaxed than the performance requirements from the primary and secondary chains. This relaxation enables the auxiliary chain to be implemented with lower cost.

In some embodiments, RFIC 28 generates an LO signal for frequency up/down conversion in the RF chains using a synthesizer comprising a master oscillator 146 and a Phase Locked Loop (PLL) module 150. Oscillator 146 is driven by a crystal oscillator 142. In FIG. 1, crystal oscillator 142 and master oscillator 146 drive PLL module 150B. In an embodiment, the output of oscillator 146 is also provided to PLL 150A (not shown in the figure.)

PLL 150A is configured to output a primary LO signal for tuning the primary TX/RX chains, secondary TX/RX chains or both to the primary channel. PLL 150B in configured to output a secondary LO signal for tuning the secondary TX/RX chains and the auxiliary chain to the secondary channel. RFIC 28 comprises an LO multiplexer 130 (also referred to as "LO mux", for brevity) that accepts the primary LO signal from PLL 150A and the secondary LO signal from PLL 150B, and outputs one of them to the mixers in the secondary TX/RX chains, e.g., under the control of processor 124.

The LO mux can be dynamically configured in one of two modes, i.e., a single-channel 80 MHz mode or a dual-channel (80+80) MHz mode. In the 80 MHz mode, the LO mux is configured so that the secondary TX/RX chains are tuned to the primary 80 MHz channel. In the (80+80) MHz mode, the LO mux is configured so that the secondary TX/RX chains are tuned to the secondary 80 MHz channel.

Note that PLL 150B provides a secondary LO signal to mixer 108 directly and independently of the setting of LO mux 130. In the present context, processor 124 and LO mux 130 are collectively referred to as "control circuitry."

The LO signals are provided to mixers 52, 92 and 108 using respective LO-drivers 138 and respective frequency dividers 134. In the present example, dividers 34 divide the frequency of the LO signal output by PLL 150 by half.

The configuration of WLAN device 20 shown in FIG. 1 is an example configuration, which is chosen purely for the sake of conceptual clarity. In alternative embodiments, any other suitable device configuration can be used. For example, device 20 may comprise any suitable number of TX/RX chains, of which at least one chain is a secondary TX/RX chain. The various reception and transmission paths in device 20 of FIG. 1 are implemented in an In-Phase/Quadrature (I/Q) configuration. Alternatively, some or all of the reception and/or transmission paths may be implemented using low IF configuration with a single real BB signal.

The division of functions among the front-ends, RFIC or BBIC may differ from the division shown in FIG. 1. The RFIC and BBIC may be integrated in a single device (e.g., on a single silicon die) or implemented in separate devices (e.g., separate silicon dies). Further alternatively, the entire functionality of the front ends may be implemented in the RFIC, or device 20 may be implemented without an RFIC. In the front-ends, filter 80 may be inserted after LNA 84 rather than before the LNA. In other configurations filter 80 and/or LNA 84 may be omitted.

The different elements of device 20 may be implemented using suitable hardware, such as in one or more RFICs, Application-Specific Integrated Circuits (ASICs) or Field-Programmable Gate Arrays (FPGAs). In some embodiments, some elements of device 20, e.g., processor 124, can be implemented using software, or using a combination of hardware and software elements. Elements of device 20 that are not mandatory for understanding of the disclosed techniques have been omitted from the figure for the sake of clarity.

In some embodiments, processor 124 is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory. This processor may be internal or external to the BBIC.

Frame Structure and Processing

Figure 2:
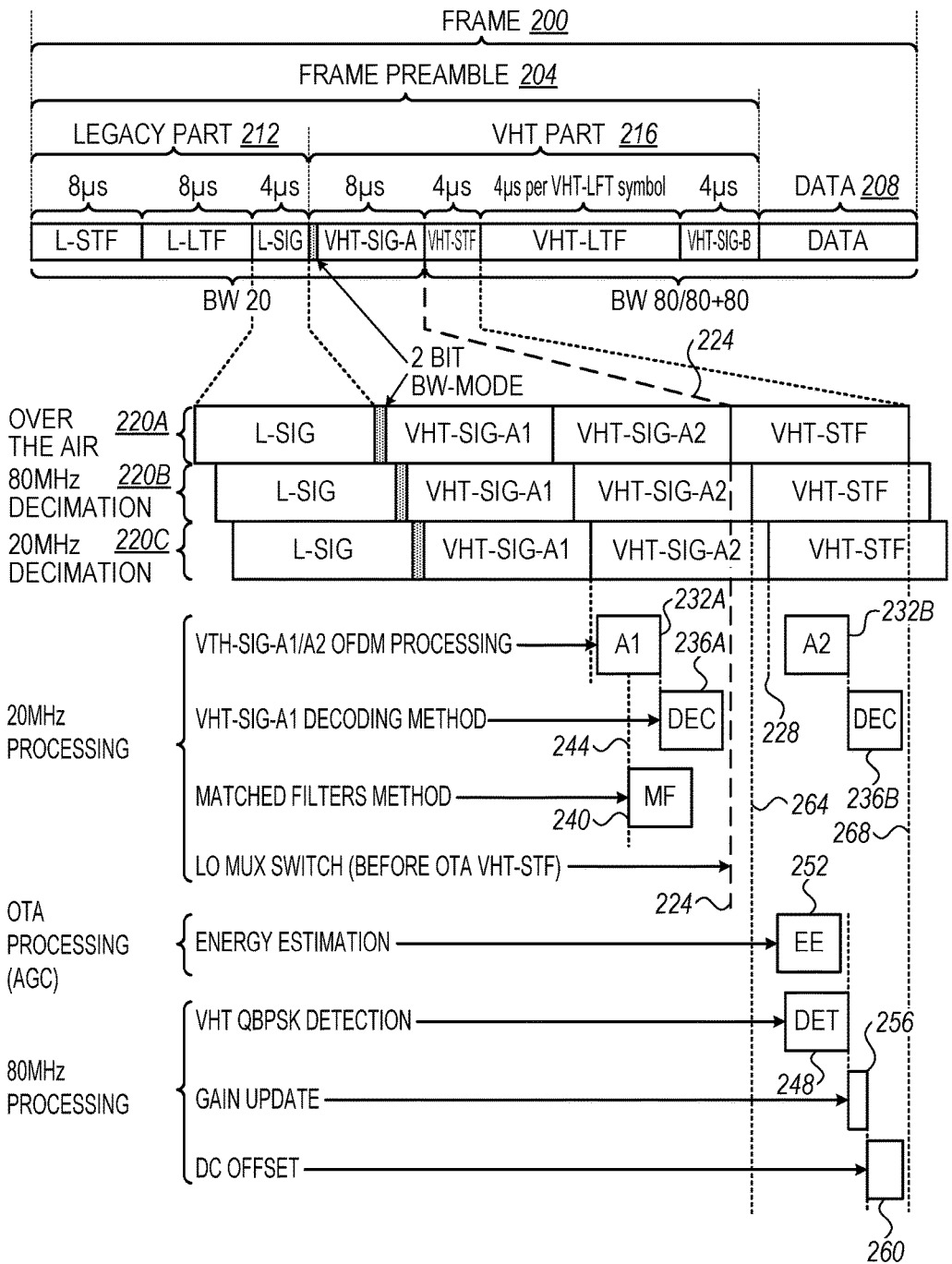
FIG. 2 is a diagram that schematically illustrates a Very High Throughput (VHT) frame, and several tasks relating to processing the frame preamble, in accordance with an embodiment that is described herein.

FIG. 2 is a diagram that schematically illustrates a Very High Throughput (VHT) frame 200, and several tasks relating to processing the frame, in accordance with an embodiment that is described herein. In the present example, frame 200 is a data frame in a communication system whose formatting conforms the IEEE standard 802.11ac cited above, which supports Very High Throughput (VHT) communication over a primary 80 MHz channel and a secondary 80 MHz channel. In accordance with the 802.11ac specifications, frame 200 may communicated in a "single-channel mode," over a primary 80 MHz channel alone, or in a "dual-channel mode" over both the primary 80 MHz channel and the secondary 80 MHz channel. In the description that follows we assume that frame 200 is received by the receiver of a communication device such as WLAN device 20 of FIG. 1.

Frame 200 comprises a preamble 204 and a data part 208. The preamble is used by the receiver for synchronizing on the frame and for tuning the TX/RX chains as well as for adjusting various parameters in the receiver so that the data part is demodulated and decoded reliably. Preamble 204 comprises a legacy part 212 and a VHT part 216. The legacy part is backwards compatible with previous versions of the IEEE 802.11 family such as the 802.11ac/g/n specifications cited above, and is transmitted over one or more 20 MHz bands of the primary and/or secondary 80 MHz channels. Frame 200 is communicated using an OFDM modulation scheme, in which every OFDM symbol carries information over multiple sub-carriers that jointly span the underlying used bandwidth. In the present example, the duration of a single OFDM symbol is 4 μs.

Legacy part 212 includes an 8 μs Legacy-Short Training Field (L-STF), an 8 μs Legacy-Long Training Field (L-LTF) and a 4 μs Legacy-Signal (L-SIG) field. The information carried in the L-STF and L-LTF fields is the same for both legacy and VHT frames and allows the device to detect the frame, and to perform tasks such as frequency offset estimation and timing synchronization. The L-SIG field includes information regarding the length of the rest of the frame.

VHT part 216 includes fields that are unique to frames formatted in accordance with the 802.11ac specification, and is omitted in legacy formatted frames. The field denoted VHT-SIG-A contains two sub-fields denoted VHT-SIG-A1 and VHT-SIG-A2, each of which is carried over multiple sub-carriers of an OFMD symbol using a respective BPSK modulation scheme. The BPSK modulation scheme used for the VHT-SIG-A2 field is rotated by 90 degrees relative to the BPSK modulation scheme used for the VHT-SIG-A1 field. Such a modulation scheme, which is also referred to as a QBPSK modulation scheme, enables a VHT device to identify the frame as a VHT frame.

Each of the VHT-SIG-A1 and VHT-SIG-A2 fields contains 24 bits. The first two bits in VHT-SIG-A indicate the frame BW-mode, and the other VHT-SIG-A bits define operating parameters such as the underlying Modulation and Coding Scheme (MSC), the number of spatial streams, and the like. The VHT-SIG-A field is encoded using an Error Correcting Code (ECC), which in 802.11ac is rate 1/2 Binary Convolutional Code (BCC) that can be decoded using a Viterbi decoder.

Subsequently to the VHT-SIG-A field, VHT part 216 contains a VHT-STF field that is used mainly for implementing automatic gain control (AGC) in MIMO transmissions. VHT part 216 additionally contains up to eight VHT-LTF fields and a VHT-SIG-B field. The VHT-LTF fields can be used for channel estimation and equalization, e.g., in MIMO application. The VHT-SIG-B field provides information on the length of data part 208, as well as MCS information in Multi-User (MU)-MIMO applications.

Legacy part 212 and VHT-SIG-A are communicated over the 20 MHz band defined for legacy frames, and are duplicated over 20 MHz sub-bands of the actual bandwidth used, i.e., duplicated over two, four and eight 20 MHz bands for the 40 MHz, 80 MHz 160/(80+80) MHz channels, respectively.

Early Detection of the BW-Mode

FIG. 2 depicts three versions 220A . . . 220C part of frame 200 including the fields between L-SIG and VHT-STF, wherein the three versions correspond to three processing stages in the receiver that incur different respective processing latencies.

Version 220A refers to an over-the-air (OTA) signal received by antenna 76, down-converted by mixer 92 and digitized by ADC 104. Versions 220B and 220C refer to the digitized signal after decimation to 80 MHz and to 20 MHz, respectively.

As described above, the preamble fields up to and including VHT-SIG-A are transmitted over the legacy 20 MHz bandwidth (and replicated to other 20 MHz sub-bands to cover the entire bandwidth of the frame), whereas VHT-STF and subsequent fields (including the data part) are transmitted using the 80 MHz single-channel mode or the 160/(80+ 80) MHz dual-channel mode. Therefore, to be able to decode the VHT-STF and subsequent fields correctly, the receiver is required to tune the secondary TX/RX chains to the single-channel or dual-channel mode before receiving the VHT-STF field over the air, i.e., before the point in time indicated by a dotted line 224. This means that a receiver that toggles LO mux 130 during preamble processing, should decide on the actual BW-mode and configure the LO mux accordingly no later than the time indicated by dotted line 224. Note that the position of line 224 in the figure represents ideal conditions, for the sake of clarity. In practice, the receiver should make the decision a short time earlier than time 224 to allow propagation time of the signal through the baseband filters.

Note that a conventional receiver would typically wait until receiving the entire VHT-SIG-A field before decoding the two BW-mode bits, e.g., using a Viterbi decoder. Since, however, the VHT-SIG-A field can be processed only starting at a time 228, such a receiver would fail to switch the LO mux before time 224.

Now we describe several embodiments in which the receiver decides whether the frame is transmitted in the single-channel or dual-channel mode, and based on the decision is able to configure the LO-mux in time, e.g., before receiving the VHT-STF field over-the-air.

In some embodiments, the receiver first decodes the VHT-SIG-A1 field without waiting for receiving the VHT-SIG-A2 field. The receiver processes the OFDM symbol of the VHT-SIG-A1 field by performing task 232A, which typically comprises the following sub-tasks:
Frequency offset compensation
Fast Fourier Transform (FFT) to derive a time-frequency representation of the OFDM symbol
Signal equalization
Common Phase Error (CPE) estimation and compensation
De-mapping from the time-frequency representation to modulated data symbols In some embodiments, the processing duration of task 232A is about 2 μs. Following task 232A, the receiver may further process the modulated data symbols to decide on the actual BW-mode.

In one embodiment, the receiver decodes the modulated data symbols to recover the 24 bits of the VHT-SIG-A1 field, using a decoding task 236A, which typically comprises Viterbi decoding. The receiver then configures and tunes the TX/RX chains, including the LO mux, based on the decoded BW-mode bits. Since in the 802.11ac specifications the BCC used is relatively short and the BW-mode bits are the first two bits, decoding these bits using a Viterbi decoder over the VTH-SIG-A1 field alone has similar reliability as applying Viterbi decoding to the full VHT-SIG-A field.

Note that SIG-A2 contains 6 tail bits that enable the Viterbi decoder to conventionally decode all the SIG-A bits reliably (when applied to the full SIG-A field containing both SIG-A1 and SIG-A2.) In the disclosed embodiments, Viterbi decoding is first applied to SIG-A1 only, which has no tail bits. Since, however, the BW-mode bits are the first two bits of the 24 SIG-A1 bits, the remaining 22 bits serve as tail bits, so that the BW-mode bits are Viterbi decoded reliably. To decode the entire SIG-A1 bits (plus the SIG-A2 bits) reliably, Viterbi decoding is applied later again to the entire SIG-A bits.

In an alternative embodiment, instead of decoding the BW-mode bits explicitly, the receiver decides on the frame BW-mode using task 240, in which the receiver applies matched filters in the frequency domain, as will be described below. To perform task 240 the receiver needs to perform only part of the sub-tasks comprising task 232A, i.e., the FFT and possibly also the equalization. By omitting CPE estimation and compensation, de-mapping, and de-interleaving sub-tasks of task 232A and Viterbi decoding task 236A, the receiver can start task 240 at time 244, i.e., typically about 1 μs after receiving the VHT-SIG-A1 field.

In the 802.11ac specifications, the two BW-mode bits are encoded into four encoded bits using a rate 1/2 BCC. Table 1 summarizes the BW-mode bits and respective BCC coded bits. In some embodiments, the receiver has a four-tap matched filter, which is designed to match the four-bit combination assigned to the (80+80) MHz BW-mode.

TABLE 1

BW-mode bits assignments

| BW-mode bandwidth | BW-mode bits {B0, B1} | Coded bits | MF output |
|---|---|---|---|
| 20 MHz | {0, 0} | {0, 0, 0, 0} | −2 |
| 80 MHz | {0, 1} | {0, 0, 1, 1} | −2 |
| 40 MHz | {1, 0} | {1, 1, 0, 1} | 0 |
| 160/(80 + 80) MHz | {1, 1} | {1, 1, 1, 0} | 4 |

Let {i0, i1, i2, i3} denote the inputs to the matched filter. In some embodiments, i0 . . . i3 are equalized samples derived by applying equalization to the outputs of the FFT, as part of the OFDM symbol processing task 232A. The samples i0 . . . i3 correspond to selected sub-carriers of the OFDM symbols. In accordance with the last row of Table 1, the values of matched filter taps are given by {1,1,1,−1}, and the matched filter output is given by:

$$MF160=Re(i0)\cdot1+Re(i1)\cdot1+Re(i2)\cdot1+Re(i3)\cdot(-1) \quad \text{Equation 1:}$$

The rightmost column in Table 1 depicts the output value of the matched filter of Equation 1 for each of the four possible values of the BW-mode. As seen in Table 1, the matched filter output in case of BW-mode 40 MHz equals 0, which is the closest to the correct output 4. In an embodiment, the receiver compares the matched filter output MF160 to a predefined threshold TR=2. The receiver decides that the actual BW-mode of the frame is 160/(80+80) MHz when MF160>TR and that the BW-mode is different from 160/(80+80) MHz when MF160≤TR.

In an embodiment, to reduce the probability of wrongly detecting a BW-mode other than the 160/(80+80) MHz BW-mode, the receiver comprises, in addition to the MF160 filter, a second filter that is matched to the BW-mode 80 MHz, as given by Equation 2.

$$MF80=Re(i0)\cdot(-1)+Re(i1)\cdot(-1)+Re(i2)\cdot1+Re(i3)\cdot1 \quad \text{Equation 2:}$$

In this embodiment, the receiver makes a decision by comparing MF160 to a threshold TR1 and also compares MF80 to a different threshold TR2. For example, the receiver decides that the actual BW-mode is 160/(80+80) MHz only when both conditions MF160>TR1 and MF80<TR2 are met. In some embodiments, the thresholds are predetermined to TR1=2 and TR2=1.

In some embodiments, the receiver identifies that the frame is VHT formatted using the inherent QBPSK modulation scheme of the VHT-SIG-A field. In such embodiments, the receiver applies to the signal of VHT-SIG-A a QBPSK detection task 248 to detect the 90 degrees phase rotation between the VHT-SIG-A1 and VHT-SIG-A2 fields. Typically, the receiver can start the QBPSK detection task after receiving the entire VHT-SIG-A, i.e., after a point in time 228.

In some embodiments, the receiver decides whether the frame is transmitted over the primary 80 MHz channel alone or over both the primary and secondary 80 MHz channels before receiving the VHT-SIG-A1 field (in which the BW-mode bits are comprised) by evaluating correlations of the signal between the primary and secondary channels. The signal is expected to be highly correlated between the primary and secondary channels only when the secondary channel is being used.

As described above, the preamble is duplicated over four 20 MHz sub-bands of the primary 80 MHz channel and over additional four 20 MHz sub-bands of the secondary 80 MHz channel, when being used. In some embodiments, before receiving a frame, the LO mux is initialized to tune the secondary TX/RX chains to the secondary 80 MHz channel (such an initialization is referred to as OPTION1 further below.) The receiver receives legacy part 212 of the frame preamble, and correlates the signal between 20 MHz sub-bands in the primary and secondary channels. Evaluating the correlations can be carried out in the time domain or in the frequency domain. For example, the properties of the L-LTF field are well suited for evaluating the correlations in the frequency domain. When the one or more of the calculated correlations (or a result of some function applied to these correlations) are above a predefined correlation threshold, the receiver decides that the frame is transmitted over both the primary and secondary 80 MHz channels. Otherwise, the receiver decides that the frame is transmitted over the primary 80 MHz channel alone.

In some embodiments, when the secondary TX/RX chains are tuned to the primary channel, the sub-bands of the primary channel are correlated with sub-bands of the signal received via the auxiliary channel.

VHT-STF Processing

Now we describe several processing tasks that the receiver applies to the VHT-STF field, the tasks mainly comprise an energy estimation task 252, a gain updating task 256 and a DC offset task 260. The VHT-STF field is the first VHT field in frame 200 that is transmitted over the 80 MHz channel or over the (80+80)/channel. In the description that follows we assume that LO mux 130 has been configured to the correct 80 MHz or (80+80) MHz mode no later than a starting point time 264 of the VHT-STF field in the 80 MHz decimated signal.

In some embodiments, the receiver implements AGC by estimating the energy of the received signal over some time period, and adjusts the gain of amplifiers 88 and 100 in the receive path of the secondary TX/RX chains accordingly. In some embodiments, the receiver initializes the gains in RF chains 36 based on energy measurement over the legacy part (e.g., the L-STF field) of the preamble, e.g., by configuring amplifiers 88 and 100. After configuring the LO mux and RX chains to the actual BW-mode 80 MHz or (80+80) MHz and allowing the LO mux and the amplifiers to settle (i.e., no later than time 224) the receiver measures the energy of the VHT-STF signal using energy estimation task 252.

Since VHT frames and legacy frames may require different gain setting in the secondary TX/RX chains, in case the receiver detects that the frame is VHT formatted, e.g., using QBPSK detection task 248, the receiver, in some embodiments, updates the gain in the TX/RX chain (depicted as task 256 in the figure). Note that for minimal latency, energy estimation task 256 should end before the QBPSK detection ends.

Note that in conventional implementations, updating the gain based on the VHT-STF field is optional, and may be used for setting the gain more accurately. In the disclosed embodiments, however, in which dynamic LO mux switching is used, updating the gain as described above is typically required since the initial gain estimated from the primary channel can be very different from the gain required for the secondary channel.

After updating the gain and allowing the amplifiers to settle, the receiver estimates the DC offset of the signal and adjusts the signal to have zero (or close to zero) DC offset, using a DC offset estimation and compensation task 260, which in some embodiments takes about 0.4-0.8 µs. Processing the signal of the VHT-STF field, including energy estimation task 252, gain update task 256 and DC compensation task 260 should be concluded before the VHT-LTF field starts, i.e., within 4 µs of the VHT-STF field and before a point in time 268. Although estimating the DC offset is carried out in the BBIC, the DC offset correction is applied within the RFIC.

Frame Reception and Transmission

Figure 3:
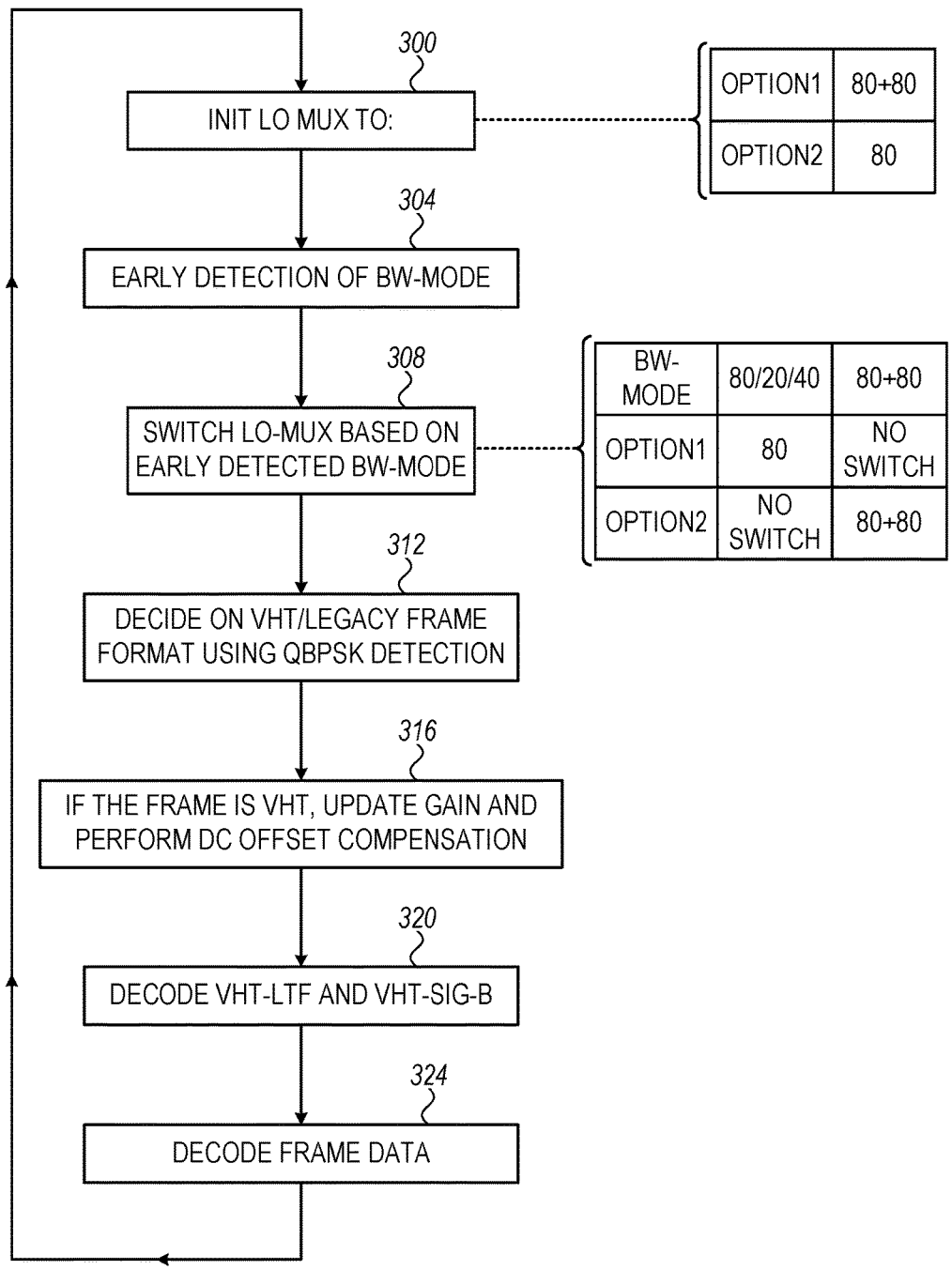
FIG. 3 is a flow chart that schematically illustrates a method for processing a frame received in a WLAN device, in accordance with an embodiment that is described herein.

FIG. 3 is a flow chart that schematically illustrates a method for processing a frame received in WLAN device 20, in accordance with an embodiment that is described herein.

The receiver is required to support BW-mode 160/(80+80) MHz as well as BW-modes 80 MHz, 40 MHz and 20 MHz. The receiver has no prior knowledge of the actual BW-mode of the received frame, which knowledge is gained by processing the frame preamble, e.g., using the embodiments described above. In the disclosed embodiments, to process the preamble the device initially tunes the LO mux using one of two options: in OPTION1 the LO mux is initialized to the (80+80) MHz mode, whereas in OPTION2 the LO mux is initialized to the 80 MHz mode. When the actual BW-mode of the frame becomes available, the LO mux is re-configured accordingly.

The method begins with processor 124 configuring the LO mux, at an initialization step 300. In some embodiments, the processor initializes the LO mux according to OPTION1, i.e., to the 80+80 MHz mode. In this case RF chains 36A and 36B are tuned to the primary 80 MHz channel and RF chains 36C and 36D are tuned to the secondary 80 MHz channel. In alternative embodiments, the processor initializes the LO mux according to OPTION2, i.e., to the 80 MHz mode. In this case, all four RF chains 36A . . . 36B are tuned to the primary 80 MHz channel. In OPTION2 the preamble is typically received at higher reliability than in OPTION1, for frames whose actual bandwidth is 80 MHz, 40 MHz or 20 MHz, because the noise in the secondary 80 MHz channel is excluded.

At an early detection step 304, the processor makes a decision of whether the frame is transmitted over the primary channel alone or over both the primary and secondary channels, wherein the decision is made before receiving the entire VHT-SIG-A field, e.g., using one of the methods for BW early detection described above with reference to FIG. 2. In the present example, making the decision comprises detecting the BW-mode bits of the VHT-SIG-A1 field.

At a tuning step 308, the processor re-configures the LO mux based on the decision made at step 304. In OPTION1 the LO mux was initialized to the (80+80) MHz mode, and if the evaluated BW-mode is 80 MHz, 40 MHz or 20 MHz, the processor switches the LO mux to the 80 MHz mode. In OPTION2, the LO mux was initialized to the 80 MHz mode, and if the evaluated BW-mode is (80+80) MHz the processor switches the LO mux to the (80+80) MHz mode. In cases in which the evaluated BW-mode conforms the initial setting of LO mux the processor need not re-configure the LO mux.

In some embodiments, because the VHT-SIG-A2 signal received via RF channels 36C and 36D may be corrupted as a result of the LO mux switching within the VHT-SIG-A2 field boundaries, the processor processes the VHT-SIG-A2 field using only the signals received by RF channels 36A and 36B. In alternative embodiments, the processor switches the LO mux in synchronization with the transition between the VHT-SIG-A2 and VHT-STF fields, which prevents corruption to the VHT-SIG-A2 signal. In these embodiments, the processor processes signals of the VHT-SIG-A2 field received by all RF chains 36A . . . 36D in the primary 80 MHz channel to improve the processing gain.

At a VHT detection step 312, the processor determines whether the frame is a VHT frame or a legacy frame by applying QBPSK detection (e.g., using task 248) to the VHT-SIG-A field. If at step 312 the processor determines that the frame is a VHT frame, the processor updates the gain in the secondary TX/RX chains, and performs DC compensation, at a VHT-STF processing step 316, e.g., using tasks 256 and 260 as described above.

In some embodiments, concurrently to the VHT-STF processing at step 316, the processor decodes the VHT-SIG-A field (e.g., using tasks 232B and 236B) to extract operating parameters conveyed in this field, using a Viterbi decoder. At a rest of VHT part processing step 320, the processor processes and decodes the VHT-LTF and VHT-SIG-B fields of the frame preamble, and completes preparing for receiving the frame data. At a data decoding step 324, the processor decodes the frame data, and when the entire data has been decoded, the processor loops back to initialize the LO mux (in accordance with OPTION1 or OPTION2) before receiving a subsequent frame.

At step 304, the processor may wrongly identify a legacy-formatted frame having a data rate of 6 MBbps as a VHT frame in the 160/(80+80) MHz BW-mode. This can happen in 25% of the legacy frames having a data rate of 6 MBbps, which is the probability of the two BW-mode bits matching the value indicating the (80+80) MHz BW-mode. In this case, the processor configures the LO mux to the (80+80) MHz mode at step 308, but later decides on a legacy frame based on QBPSK detection, at step 312. In this case the symbols that may be corrupted because of the LO switching at step 308 should be processed only using signals received via the primary TX/RX chains (RF chains 36A and 36B) tuned to the primary channel. In some embodiments, upon detecting that the frame is legacy formatted based on the QBPSK detection, the processor switches the LO mux back to the 80 MHz mode, in which case only a few OFDM symbols will be processed using the signals received via a partial subset of the TX/RX chains.

Figure 4:
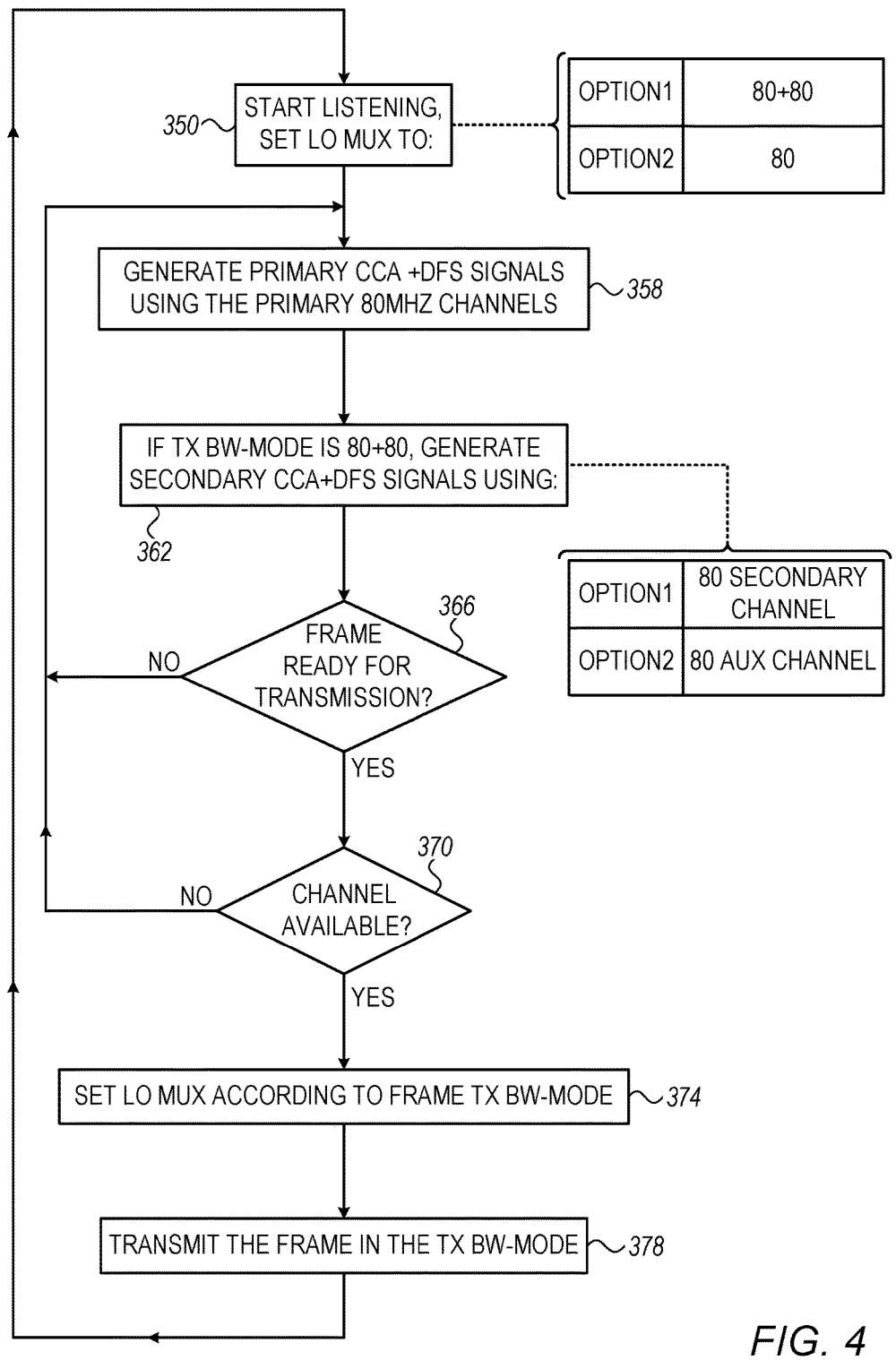
FIG. 4 is a flow chart that schematically illustrates a method for transmission in a WLAN device, in accordance with an embodiment that is described herein.

FIG. 4 is a flow chart that schematically illustrates a method for transmission in WLAN device 20, in accordance with an embodiment that is described herein.

According to the 802.11 standards, WLAN device 20 is required to monitor channel activity over the entire bandwidth in which the device operates. Table 2 depicts a channelization example as defined, for example, in the IEEE 802.11ac specifications. In Table 2, each of the used channels is defined by its bandwidth, 80 MHz, 40 MHz or 20 MHz, and by a "p" or "s" letter which designates the channel as primary or secondary, respectively.

TABLE 2

802.11ac channelization

| 40s | 80p | | | 80s |
|---|---|---|---|---|
| | | 40p | | |
| | 20p | | 20s | |

In some embodiments, the processor monitors the occupancy of a given channel and generates a respective Clear Channel Assessment (CCA) indication. For example, prior to transmitting a VHT frame over the 160/(80+80) MHz channel, the processor monitors both the 80p and 80s channels and generates respective primary and secondary CCA signals.

In some frequency bands, e.g., in part of the 5 GHz band, regulatory requirements specify that WLAN device 20 must detect the presence of radar signals and, if detected, switch to a different channel. Such channels are referred to as Dynamic Frequency Selection (DFS) channels. This requirement holds both before and during communication.

Before starting communication on a given channel, device 20 is required to verify that the channel is free of radar signals for at least sixty seconds. This mechanism is referred to as Channel Availability Check (CAC). In addition, device 20 is required to check for radar signals during normal communication, and switch to a different channel if a radar signal appears on the currently-used channel. This mechanism is referred to as In-Service Monitoring (ISM).

The CAC and ISM mechanisms are specified, for example, in ETSI Standard EN 301 893 entitled "Broadband Radio Access Networks (BRAN); 5 GHz high performance RLAN; Harmonized EN covering the essential requirements of article 3.2 of the R&TTE Directive," version 1.7.0, January, 2012, which is incorporated herein by reference. Section 4.7 of this standard addresses DFS operation, including avoidance of co-channel operation with radar systems. Section 4.7.2.2 specifies an off-channel CAC mechanism that monitors channels different from the operating channel for the presence of radar signals.

The method of FIG. 4 begins at a listening step 350, in which the processor initializes the LO mux and the TX/RX chains. As described above, the processor may initialize the LO mux in accordance with OPTION1 or OPTION2. In some embodiments, the processor initializes the LO mux to the (80+80) MHz mode (OPTION1), in which case the device listens over both the 80p and 80s channels. In other embodiments, the processor initializes the LO mux to the 80 MHz mode (OPTION2), in which case the device can listen over the 80p channel or over one of the 40 MHz and 20 MHz channels within the 80p channel.

At a primary CCA generation step 358, the processor generates primary CCA and primary DFS indications from signals received via the primary TX/RX chains (RF chains 36A and 36B), which are available independently of the LO mux setting. At a secondary CCA generation step 362, which is typically carried out in parallel to step 358, if the frame is to be transmitted in the 160/(80+80) MHz mode, the processor generates secondary CCA and DFS indications depending on whether the LO mux was initialized according to OPTION1 or OPTION2. In OPTION1, the processor generates the secondary CCA and secondary DFS indications using 80s signals received via the secondary TX/RX chains (RF chains 36C and 36D), or alternatively using the signals received via the auxiliary RX chain. In OPTION2, the 80s channel in initially unavailable, and the processor generates the secondary CCA and secondary DFS indications using the 80s signal received via auxiliary chain 40.

At a transmission request check step 366, the processor checks whether there is a frame ready for transmission, and if so, what is the respective TX BW-mode requested. If at step 366 there is no frame ready, the processor loops back to step 358 to continue listening. Otherwise, at an availability check step 370, the processor receives, e.g., from a Medium Access Control (MAC) module, signaling that indicates whether the requested channel is available for transmission based on the CCA and DFS indication generated as steps 358 and 362. If the requested channel is unavailable, the processor loops back to step 358 to continue listening. Otherwise, the processor sets the LO mux in accordance with the requested TX BW-mode, at a tuning step 374. If the TX BW-mode is 160/(80+80) MHz, the processor configures the LO mux to the (80+80) MHz mode and tunes the filters in the four TX/RX chains to 80 MHz. Otherwise, the TX BW-mode is 80 MHz, 40 MHz, or 20 MHz, and the processor tunes the LO mux to the 80 MHz mode and tunes the filters in the TX/RX chains to the respective bandwidth. At a transmission step 378, the processor transmits the frame via the TX/RX chains. Following frame transmission the processor loops back to step 350 to continue listening.

Embodiments with Proprietary BW Configurations

In the embodiments described above, the primary and secondary TX/RX chains support filtering up to 80 MHz. To support both 80 MHz and 160/(80+80) MHz channels, the device tunes at least one of the secondary TX/RX chains to one of the 80p or 80s channels using the LO mux.

The same concept can be applied in cases in which the TX/RX chains are limited to 40 MHz or to 20 MHz channels. In the 40 MHz case, for example, the device can select between operating all the TX/RX chains in a primary 40 MHz channel or dividing the TX/RX chains between primary and secondary 40 MHz channels, i.e., thus supporting a 80/(40+40) MHz mode. Similarly, in the 20 MHz case, the device can support a 20 MHz mode and a 40/(20+20) MHz modes.

In some embodiments, different TX/RX chains may support different bandwidth limitations. For example, some of the TX/RX chains support up to 80 MHz channels whereas other TX/RX chains support only 40 MHz and/or 20 MHz channels. In these embodiments, the device supports hybrid modes such as, for example, 120/(80+40) MHz or 100/(80+20) MHz modes. Such uneven hybrid combinations can also be useful in cases in which all the TX/RX chain support the same bandwidth limitations but the secondary (or primary) channel is partially occupied and can be operated using part of its bandwidth.

In each of the (80+80) MHz, (40+40) MHz and (20+20) MHz configurations, the data rate is twice as high the data rate of the respective 80 MHz, 40 MHz or 20 MHz configuration. For example, sending one (or two) spatial streams over a (40+40) MHz channel results in a similar data rate as sending two (or four) spatial streams over a 40 MHz channel. A sub-channel (e.g., a 20 MHz, 40 MHz or 80 MHz sub-channel) can deliver a number of spatial streams up to the effective number of antennas allocated to this sub-channel.

In some embodiments, WLAN device 20 is configured to support the 80/(40+40) MHz mode, as described above, and therefore supports communicating up to 4/4/2 spatial streams over 20 MHz/40 MHz/(40+40) MHz channels, respectively. Consider a MAC module that is unaware of the (40+40) MHz mode and supports the 20 MHz/40 MHz/80 MHz modes. In the (40+40) MHz mode, the 40s (secondary 40 MHz) CCA signal is derived as a logical OR of the 20p CCA and 20s CCA signals of the auxiliary chain.

Similarly, when WLAN device 20 supports a 40/(20+20) MHz, the device supports communicating up to 4/2 spatial streams over 20 MHz/(20+20) MHz, respectively. In case the MAC supports the 20 MHz/40 MHz modes, the 20s CCA signal is derived from the 20p CCA signal of the auxiliary chain.

The example configurations described above are not supported in the 802.11ac specifications, and therefore using such configurations requires special signaling of the BW-mode in the VHT-SIG-A field of the frame preamble. In some embodiments, the 80/(40+40) MHz mode is signaled by setting the BW-mode bits to the 80 MHZ BW-mode. Similarly, the 40/(20+20) MHz mode is signaled by setting the BW-mode bits to the 40 MHz mode. In alternative embodiments, both the 80/(40+40) MHz and the 40/(20+20) MHz modes are signaled by setting the BW-mode bits to the 160/(80+80) MHz BW-mode.

When WLAN device 20, which is configured to the 80/(40+40) MHz mode or to the 40/(20+20) MHz mode, receives a frame whose BW-mode bits indicate the 80 MHz mode (or the 40 MHz mode), the processor configures the LO mux to the (40+40) MHz mode or to the (20+20) MHZ mode, respectively. In case WLAN device 20 receives a 80 MHz frame sent by a 3rd party (which the receiver cannot decode anyway), the device will try to decode this frame as in (40+40) MHz mode, and fail.

In general, a WLAN device supporting the (40+40) MHz mode configures the BW for each of its TX/RX chains to 40 MHz, and can therefore receive either a 20 MHZ, 40 MHz or (40+40) MHz frame. Similarly, a WLAN device that supports the (20+20) MHz mode, can decode either 20 MHz or (20+20) MHz frames.

Maintaining Phase Coherency Between RF Chains in MIMO Applications

Multiple In Multiple OUT (MIMO) communications is carried out over multiple transmit and receive antennas. Using multiple transmit antennas enables the transmit station to steer and shape the transmitted signal by applying certain phase and gain values to each antenna. Proper MIMO operation relies on maintaining phase coherency, i.e., constant phase differences, among the transmit antennas.

In the description that follows the terms "TX chain" and "RX chain" refer to the transmit path and receive path of a TX/RX chain, respectively.

Steering parameters used in beamformed transmissions depend on the characteristics of the communication channel between the transmitter and receiver, which is also referred to as Channel State Information (CSI) and can be estimated by performing a calibration procedure, also referred to as "BF calibration."

In explicit calibration, the transmit station transmits a sounding frame to the receive station, which uses the sounding frame to estimate the CSI, and sends the estimated CSI back to the transmit station. For proper operation, the phase differences among the TX chains that were determined based on the CSI feedback should be used in subsequent beamformed transmissions, as long as the CSI feedback reliably represents the communication channel.

In implicit calibration, the transmit station estimates the CSI from a frame sent by the receive station in the uplink direction. In implicit calibration, phase and gain differences among the TX chains and among the RX chains are calibrated using a calibration vector. This calibration vector (not to be confused with the CSI) can be determined using any suitable method.

In some embodiments, frequency dividers 134 in the TX/RX chains are resettable, and operated only when needed to save power. In these embodiments, the processor sets the LO mux, and after the LO mux has settled the processor sets the states of the respective frequency dividers feeding LO signal to the TX chains to known phase differences. Note that configuring the frequency dividers feeding LO signal to the RX chains before receiving a frame cannot prevent loss of phase coherency due to the LO switching during the frame reception.

In other embodiments, the frequency dividers are non-resettable and configured to operate continuously. In these embodiments, the mixers in the primary TX/RX chains (RF chains 36A and 36B) are fed with a continuous LO signal and therefore phase coherency is maintained. As opposed to the primary TX/RX chains, the states of the frequency dividers in the secondary TX/RX chains (RF chains 36C and 36D) change to unknown states upon LO mux switching. As a result, phase coherency among the secondary TX chains and among the RX chains, as well as relatively to the primary TX and RX chains is lost.

As described above, when the WLAN device initializes the LO mux to the 80 MHz mode according to OPTION2, and receives or transmits a VHT frame whose BW-mode is 160/(80+80) MHz, the processor switches the LO mux to the (80+80) MHz mode, and switches back to the 80 MHz mode when the receive or transmit operation is completed. Since after switching back the LO mux, all the TX/RX chains are fed with the same LO signal, phase coherency is lost due to 180 degrees ambiguity, resulting from frequency division by two (by frequency dividers 134.)

In some embodiments, the processor resolves the phase ambiguity using a loopback phase calibration procedure as described herein. The loopback calibration procedure takes advantage of residual leakages that exists among the TX/RX chains, e.g., via bond-wires connected to pins of the RFIC package. The processor may use the loopback calibration to calibrate the secondary TX chains, the secondary RX chains, or both.

To calibrate the secondary TX chains, the processor assigns one of the primary RX chains as a reference RX chain, and measures the phase difference between each of the secondary TX chains and the reference RX chain. To measure the phase difference for a given secondary TX chain, the processor injects a known signal (e.g., having a sine waveform) to the given TX chain via its DAC 44, captures a portion of the injected signal that has leaked into the reference RX chain, and measures the phase difference between the injected and captured signals using any suitable method. In an embodiment, to minimize power emission over the air during the loopback calibration, the processor may shut down amplifiers 56 in the RFIC and power amplifiers 64 in the front end of the relevant secondary chains.

In some embodiments, the processor performs the loopback calibration for multiple secondary TX chains in parallel by injecting to these TX chains sine wave signals of different respective frequencies, simultaneously. The processor can calibrate the secondary RX chains relative to a selected primary TX chain using a loopback calibration method similar to the one described above. In this case, the processor injects the sine wave signal into a reference primary TX chain and captures the leaked signal to the secondary RX chains. Phase differences that are determined using the loopback calibration procedure are also referred to herein as "loopback phase differences."

In some embodiments, the processor re-calibrates the phase differences using the loopback calibration procedure after performing any frame receive or frame transmit operation that involves switching of the LO mux. The processor uses the re-calibrated phase differences for resolving phase ambiguities in subsequent beamformed transmissions as will be described below.

The secondary chains in which phase ambiguity should be resolved are selected depending on the BF calibration method used for estimating the CSI. When the CSI was obtained using explicit BF calibration, phase ambiguity should be resolved only in the secondary TX chains. When the CSI was obtained using implicit BF calibration, phase ambiguity should be resolved in both the secondary TX chains and secondary RX chains.

When performing BF calibration, the processor records the resulting loopback gain and phase differences used in the BF calibration. These phase differences are also referred to herein as "BF calibrated phase differences." As described above, after performing a receive or transmit operation in which the LO mux switches to the opposite mode and back, the processor derives re-calibrated phase differences as described above.

To transmit a beamformed frame, the processor compares the most recent re-calibrated phase differences with the original BF calibrated phase differences to resolve possible phase ambiguities. Thus, when a given BF calibrated phase difference does not match the respective re-calibrated phase difference, the processor applies a 180 phase correction (i.e., negation) to the signal in the relevant secondary TX or RX chain.

In some embodiments, after frame transmission in which the LO mux has been switched the device performs the re-calibration procedure during Short Interference Space (SIFS) periods, during which the air is guaranteed to be silent. For example, in the 802.11 standards the SIFS period is 16 µs, which is sufficient for re-calibration. After frame reception in which the LO mux has been switched, the device can perform the re-calibration during SIFS or after the transmission of an Acknowledgement (ACK) or a Block Acknowledgement (BA).

The embodiments described above are given by way of example, and alternative suitable embodiments can also be used.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A Wireless Local Area Network (WLAN) device, comprising:
multiple transmission/reception (TX/RX) chains, including one or more first TX/RX chains and one or more second TX/RX chains, wherein the one or more first TX/RX chains are tuned to a first channel, and the one or more second TX/RX chains are selectively tuned to the first channel or to a second channel, different from the first channel; and
control circuitry, configured to:
receive, via at least one of the multiple TX/RX chains, a frame preamble signal comprising a first part and a second part, which are both transmitted over either the first channel alone or over both the first channel and the second channel, wherein the first part is decoded from the first channel alone;
make a decision, before receiving the entire first part, whether the second part is transmitted over the first channel alone or over both the first channel and the second channel; and
tune the one or more second TX/RX chains to the first channel or to the second channel, based on the decision.

2. The WLAN device according to claim 1, wherein the WLAN device operates in accordance with an IEEE 802.11ac specifications, wherein the first channel and the second channel comprise respective primary and secondary 80 MHz channels, and wherein the first part and the second part respectively comprise a legacy part and a Very High Throughput (VHT) part of the frame preamble signal.

3. The WLAN device according to claim 1, wherein the control circuitry is configured to tune the one or more second TX/RX chains to the first channel before receiving the frame preamble signal, and to subsequently tune the one or more second TX/RX chains to the second channel in response to deciding that the second part is transmitted over both the first channel and the second channel.

4. The WLAN device according to claim 1, wherein the control circuitry is configured to tune the one or more second TX/RX chains to the second channel before receiving the frame preamble signal, and to subsequently tune the one or more second TX/RX chains to the first channel in response to deciding that the second part is transmitted over the first channel alone.

5. The WLAN device according to claim 1, wherein the control circuitry is configured to tune the one or more second TX/RX chains to the second channel before a beginning of the second part, so as to receive an entire second part by the one or more second TX/RX chains.

6. The WLAN device according to claim 1, wherein the control circuitry comprises a Local Oscillator (LO) multiplexer, wherein in a first setting the LO multiplexer outputs a first LO signal for tuning the one or more second TX/RX chains to the first channel and in a second setting the LO multiplexer outputs a second LO signal for tuning the one or more second TX/RX chains to the second channel, and wherein the control circuitry is configured to tune the one or more second TX/RX chains to the first channel or to the second channel by setting the LO multiplexer to the first setting or to the second setting, respectively.

7. The WLAN device according to claim 1, wherein the first part of the frame preamble signal comprises a bandwidth field indicative of whether the second part is transmitted over the first channel alone or over both the first channel and the second channel, and wherein the control circuitry is configured to make the decision by decoding only a portion of the first part containing the bandwidth field.

8. The WLAN device according to claim 7, wherein the frame preamble signal comprises an Orthogonal Frequency Division Multiplexing (OFDM) signal, wherein the OFDM signal carries the bandwidth field over multiple sub-carriers, and wherein the control circuitry is configured to apply to selected sub-carriers a matched filter whose taps equal an expected value of the bandwidth field when the second part is transmitted over both the first channel and the second channel.

9. The WLAN device according to claim 1, wherein the frame preamble signal is duplicated over multiple sub-bands of the first channel, and, only when the frame is transmitted over both the first channel and the second channel, the frame preamble signal is additionally duplicated over multiple sub-bands of the second channel, and wherein the control circuitry is configured to make the decision by correlating the frame preamble signal between one or more of the multiple sub-bands in the first channel and one or more of the multiple sub-bands in the second channel.

10. The WLAN device according to claim 1, wherein the control circuitry is configured to store first phase differences between at least some of the multiple TX/RX chains, wherein the first phase differences were used in estimating beamforming (BF) information using a BF calibration procedure, to generate second phase differences comprising a re-calibrated version of the first phase differences, to resolve phase ambiguities among the multiple TX/RX chains by comparing the first phase differences with the second phase differences, and to transmit a beamformed frame via the multiple TX/RX chains based on the BF information and on the resolved phase ambiguities.

11. The WLAN device according to claim 10, wherein the control circuitry is configured to re-calibrate the second phase differences by measuring a phase difference between a reference signal injected into one of the multiple TX/RX chains and a portion of the reference signal that is received in another one of the multiple TX/RX chains due to residual leakage.

12. The WLAN device according to claim 1, and comprising an auxiliary RX chain tuned to the second channel independently from a tuning selected for the one or more second TX/RX chains, wherein the control circuitry is configured to generate channel clearance and channel interference indications for the second channel based on a signal received via the auxiliary Rx chain, when the one or more second TX/RX chains are all tuned to the first channel.

13. A method for communication, comprising:
in a Wireless Local Area Network (WLAN) device comprising multiple transmission/reception (TX/RX) chains, including one or more first TX/RX chains and one or more second TX/RX chains, wherein the one or more first TX/RX chains are tuned to a first channel, and the one or more second TX/RX chains are selectively tuned to the first channel or to a second channel, different from the first channel, receiving, via at least one of the multiple TX/RX chains, a frame preamble signal comprising a first part and a second part, which are both transmitted either over the first channel alone or over both the first channel and the second channel, wherein the first part is decoded from the first channel alone;
making a decision, before receiving the entire first part, whether the second part is transmitted over the first channel alone or over both the first channel and the second channel; and
tuning the one or more second TX/RX chains to the first channel or to the second channel, based on the decision.

14. The method according to claim 13, wherein the WLAN device operates in accordance with an IEEE 802.11ac specifications, wherein the first channel and the second channel comprise respective primary and secondary 80 MHz channels, and wherein the first part and the second part respectively comprise a legacy part and a Very High Throughput (VHT) part of the frame preamble signal.

15. The method according to claim 13, wherein tuning the one or more second TX/RX chains comprises tuning the second TX/RX chains to the first channel before receiving the frame preamble signal, and subsequently tuning the one or more second TX/RX chains to the second channel in response to deciding that the second part is transmitted over both the first channel and the second channel.

16. The method according to claim 13, wherein tuning the TX/RX chains comprises tuning the one or more second TX/RX chains to the second channel before receiving the frame preamble signal, and subsequently tuning the one or more second TX/RX chains to the first channel in response to deciding that the second part is transmitted over the first channel alone.

17. The method according to claim 13, wherein tuning the one or more second TX/RX chains comprises tuning the one or more second TX/RX chains to the second channel before a beginning of the second part, so as to receive an entire second part by the one or more second TX/RX chains.

18. The method according to claim 13, wherein the WLAN device comprises a Local Oscillator (LO) multiplexer, wherein in a first setting the LO multiplexer outputs a first LO signal for tuning the one or more second TX/RX chains to the first channel and in a second setting the LO multiplexer outputs a second LO signal for tuning the one or more second TX/RX chains to the second channel, and wherein tuning the one or more second TX/RX chains comprises tuning the second TX/RX chains to the first channel or to the one or more second channel by setting the LO multiplexer to the first setting or to the second setting, respectively.

19. The method according to claim 13, wherein the first part of the frame preamble signal comprises a bandwidth field indicative of whether the second part is transmitted over the first channel alone or over both the first channel and the second channel, and wherein making the decision comprises decoding only a portion of the first part containing the bandwidth field.

20. The method according to claim 19, wherein the frame preamble signal comprises an Orthogonal Frequency Division Multiplexing (OFDM) signal, wherein the OFDM signal carries the bandwidth field over multiple sub-carriers, and wherein making the decision comprises applying to selected sub-carriers a matched filter whose taps equal an expected value of the bandwidth field when the second part is transmitted over both the first channel and the second channel.

21. The method according to claim 13, wherein the frame preamble signal is duplicated over multiple sub-bands of the first channel, and, only when the frame is transmitted over both the first channel and the second channel, the frame preamble signal is additionally duplicated over multiple sub-bands of the second channel, and wherein making the decision comprises correlating the frame preamble signal between one or more of the multiple sub-bands in the first channel and one or more of the multiple sub-bands in the second channel.

22. The method according to claim 13, and comprising storing first phase differences between at least some of the multiple TX/RX chains, wherein the first phase differences were used in estimating beamforming (BF) information using a BF calibration procedure, generating second phase differences comprising a re-calibrated version of the first phase differences, resolving phase ambiguities among the multiple TX/RX chains by comparing the first phase differences with the second phase differences, and transmitting a beamformed frame via the multiple TX/RX chains based on the BF information and on the resolved phase ambiguities.

23. The method according to claim 22, wherein generating the second phase differences comprises measuring a phase difference between a reference signal injected into one of the multiple TX/RX chains and a portion of the reference signal that is received in another one of the multiple TX/RX chains due to residual leakage.

24. The method according to claim 13, wherein the WLAN device further comprises an auxiliary RX chain tuned to the second channel independently from a tuning selected for the one or more second TX/RX chains, wherein the method comprises generating channel clearance and channel interference indications for the second channel based on a signal received via the auxiliary Rx chain, when the one or more second TX/RX chains are all tuned to the first channel.

* * * * *